US012641508B2

(12) United States Patent
Xu et al.

(10) Patent No.: US 12,641,508 B2
(45) Date of Patent: May 26, 2026

(54) METHOD AND APPARATUS FOR PERFORMING HANDOVER BASED ON AI MODEL IN A WIRELESS COMMUNICATION SYSTEM

(71) Applicant: LG ELECTRONICS INC., Seoul (KR)

(72) Inventors: Jian Xu, Seoul (KR); Daewook Byun, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 349 days.

(21) Appl. No.: 18/255,670

(22) PCT Filed: Dec. 22, 2021

(86) PCT No.: PCT/KR2021/019594
§ 371 (c)(1),
(2) Date: Jun. 2, 2023

(87) PCT Pub. No.: WO2022/186458
PCT Pub. Date: Sep. 9, 2022

(65) Prior Publication Data
US 2024/0381199 A1 Nov. 14, 2024

(30) Foreign Application Priority Data
Mar. 4, 2021 (KR) ........................ 10-2021-0028458

(51) Int. Cl.
*H04W 36/32* (2009.01)
*H04W 4/02* (2018.01)
(Continued)

(52) U.S. Cl.
CPC .......... *H04W 36/322* (2023.05); *H04W 4/02* (2013.01); *H04W 4/40* (2018.02); *H04W 24/02* (2013.01);
(Continued)

(58) Field of Classification Search
CPC ............. H04W 36/0058; H04W 24/02; H04W 36/0085; H04W 36/322; H04W 4/02;
(Continued)

(56) References Cited

U.S. PATENT DOCUMENTS

| 2013/0115954 A1 | 5/2013 | Charbit et al. |
| 2020/0092750 A1 | 3/2020 | Dharmadhikari et al. |
| 2023/0247512 A1* | 8/2023 | Hévizi ................ H04W 36/362 |
| | | 370/331 |

FOREIGN PATENT DOCUMENTS

| EP | 3072329 | 9/2016 |
| WO | 2014-089051 | 6/2014 |

(Continued)

OTHER PUBLICATIONS

PCT International Application No. PCT/KR2021/019594, International Search Report dated Apr. 4, 2022, 3 pages.
(Continued)

*Primary Examiner* — Marcus Hammonds
(74) *Attorney, Agent, or Firm* — LEE, HONG, DEGERMAN, KANG & WAIMEY

(57) ABSTRACT

A method and apparatus for performing handover based on AI model in a wireless communication system is provided. The source node acquire a mobility information for a specific UE. The source node transmits, to the specific UE, a measurement configuration including a request for a location information. The source node receives, from the specific UE, the location information. The source node determine a target RAN node for the specific UE by using
(Continued)

1 an AI model, based on the mobility information and the location information. The source node performs a handover procedure for the specific UE with the determined target RAN node.

19 Claims, 13 Drawing Sheets

(51) Int. Cl.

| | |
|---|---|
| *H04W 4/40* | (2018.01) |
| *H04W 24/02* | (2009.01) |
| *H04W 36/00* | (2009.01) |

(52) U.S. Cl.
CPC .................. *H04W 36/0085* (2018.08); *H04W 36/008375* (2023.05)

(58) Field of Classification Search
CPC .................. H04W 4/40; H04W 24/10; H04W 36/008375; H04W 36/0061; H04W 36/0033; H04W 36/385; H04W 36/30; G06N 20/00
See application file for complete search history.

(56) References Cited

FOREIGN PATENT DOCUMENTS

| | | | |
|---|---|---|---|
| WO | 2015-074810 | 5/2015 | |
| WO | WO-2020168321 A1 * | 8/2020 | ............ H04W 4/029 |
| WO | 2021-019498 | 2/2021 | |
| WO | 2021-118418 | 6/2021 | |

OTHER PUBLICATIONS

CATT, "Discussion on use cases for artificial intelligence in RAN," R3-206339, Nov. 2020, 5 pages.
CATT, "Standards impact for mobility and load forecast case," R3-206340, Nov. 2020, 4 pages.
ZTE et al., "AI based UE Trajectory Prediction," R3-206718, Nov. 2020, 6 pages.
European Patent Office Application Serial No. 21929320.6, Search Report dated Jan. 3, 2025, 19 pages.
Ericsson, "AI/ML based Use Cases," R3-206437, 3GPP TSG-RAN WG3 Meeting #110-e, Online meeting, Oct. 2020, 15 pages.
Huawei, "Further Discussions on Specification Impacts of Mobility Enhancements," R3-214081, 3GPP TSG-RAN WG3 Meeting #113-e, E-meeting, Aug. 2021, 6 pages.
Zte et al., "Solution to AI based UE Trajectory prediction," R3-213759, 3GPP TSG-RAN WG3 #113-e, Online, Aug. 2021, 10 pages.

* cited by examiner

Figure 3:
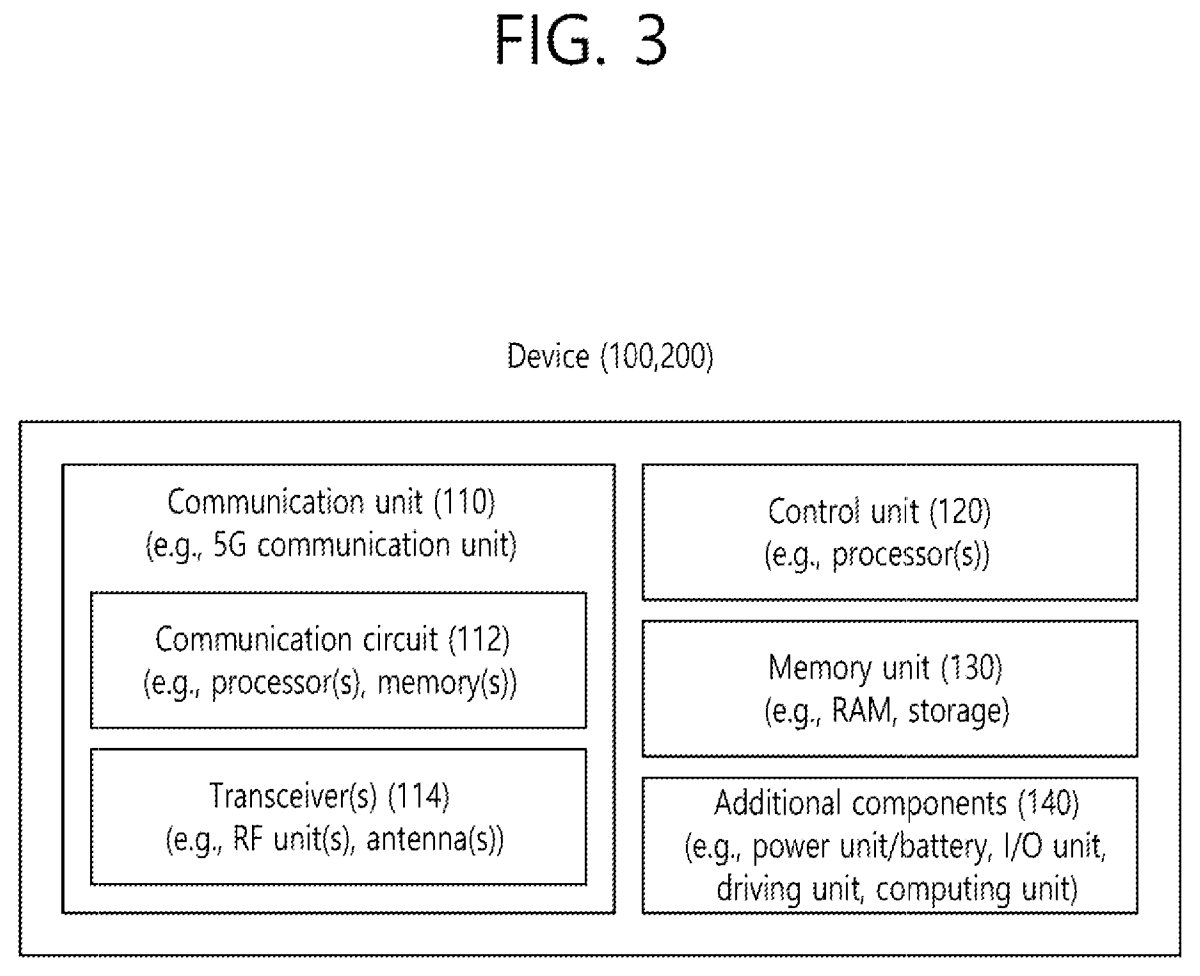

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 11

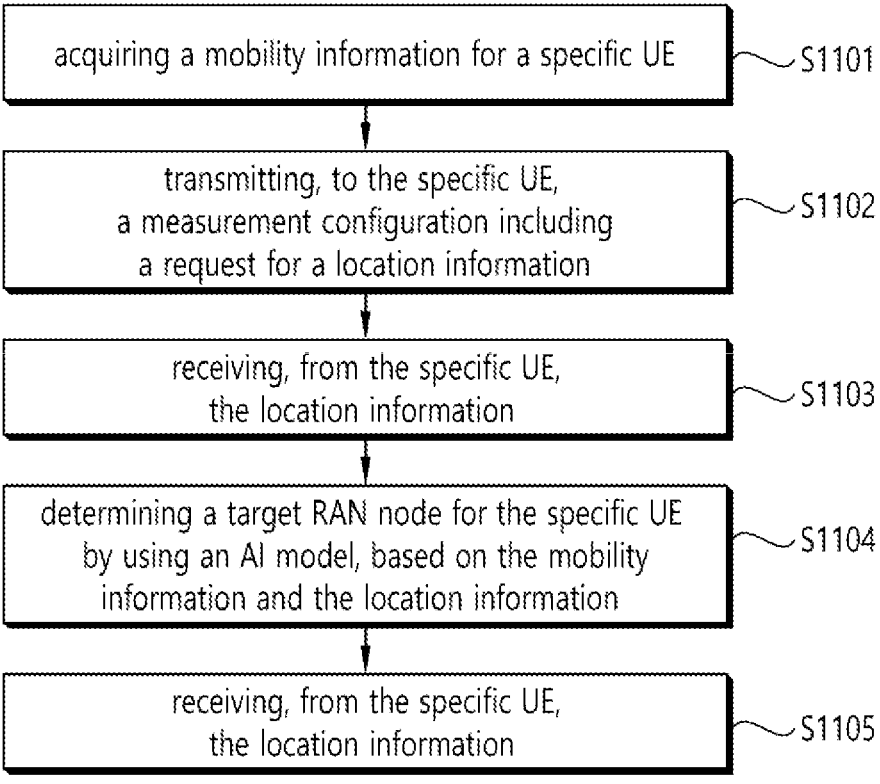

acquiring a mobility information for a specific UE    ～S1101 transmitting, to the specific UE,
a measurement configuration including
a request for a location information    ～S1102 receiving, from the specific UE,
the location information    ～S1103 determining a target RAN node for the specific UE
by using an AI model, based on the mobility
information and the location information    ～S1104 receiving, from the specific UE,
the location information    ～S1105

FIG. 12B

METHOD AND APPARATUS FOR PERFORMING HANDOVER BASED ON AI MODEL IN A WIRELESS COMMUNICATION SYSTEM

CROSS-REFERENCE TO RELATED APPLICATIONS

This application is the National Stage filing under 35 U.S.C. 371 of International Application No. PCT/KR2021/019594, filed on Dec. 22, 2021, which claims the benefit of earlier filing date and right of priority to Korean Application No. 10-2021-0028458, filed on Mar. 4, 2021, the contents of which are all hereby incorporated by reference herein in their entireties.

TECHNICAL FIELD

The present disclosure relates to a method and apparatus for performing handover based on AI model in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Artificial Intelligence (AI) including machine learning (ML) algorithms provides a powerful tool to help operators to improve the network management and the user experience, by analyzing the data collected and autonomously processed that can yield further insights. Application of AI in 5G network has gained tremendous attention in both academia and industry.

Meanwhile, in 5G NR, basic handover procedure was defined for a UE to moving between the neighbors. Conventionally, the source RAN decides a target node based on measurement report of the signaling quality of the neighbor.

However, it may cause a problem, such as, handover failure, HO to wrong cell, ping-pang.

Therefore, studies for performing handover based on AI model in a wireless communication system are needed.

In an aspect, a method performed by a source node in a wireless communication system is provided. The source node acquire a mobility information for a specific UE. The source node transmits, to the specific UE, a measurement configuration including a request for a location information. The source node receives, from the specific UE, the location information. The source node determine a target RAN node for the specific UE by using an AI model, based on the mobility information and the location information. The source node performs a handover procedure for the specific UE with the determined target RAN node.

In another aspect, an apparatus for implementing the above method is provided.

The present disclosure may have various advantageous effects.

According to some embodiments of the present disclosure, UE's mobility performance could be enhanced by using AI model for handover procedure.

For example, a source node could accurately decide a target node for handover procedure for UE.

Therefore, the handover failure (for example, handover to wrong cell, and/or handover ping-pang) could be avoided as much as possible. Then, UE's service could be guaranteed without interruption.

According to some embodiments of the present disclosure, a Radio Access Network (RAN) node could efficiently perform handover based on AI model.

For example, a RAN node could efficiently acquire information for AI based handover.

For example, a RAN node could efficiently support handover based on AI model by collecting information from a core network and the UE.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 2 shows an example of wireless devices to which implementations of the present disclosure is applied.

FIG. 3 shows an example of a wireless device to which implementations of the present disclosure is applied.

FIG. 11 shows an example of a method for performing handover based on AI model in a wireless communication system, according to some embodiments of the present disclosure.

FIGS. 12A and 12B show an example of a method for performing handover based on AI model in a wireless communication system.

DETAILED DESCRIPTION

Figure 4:
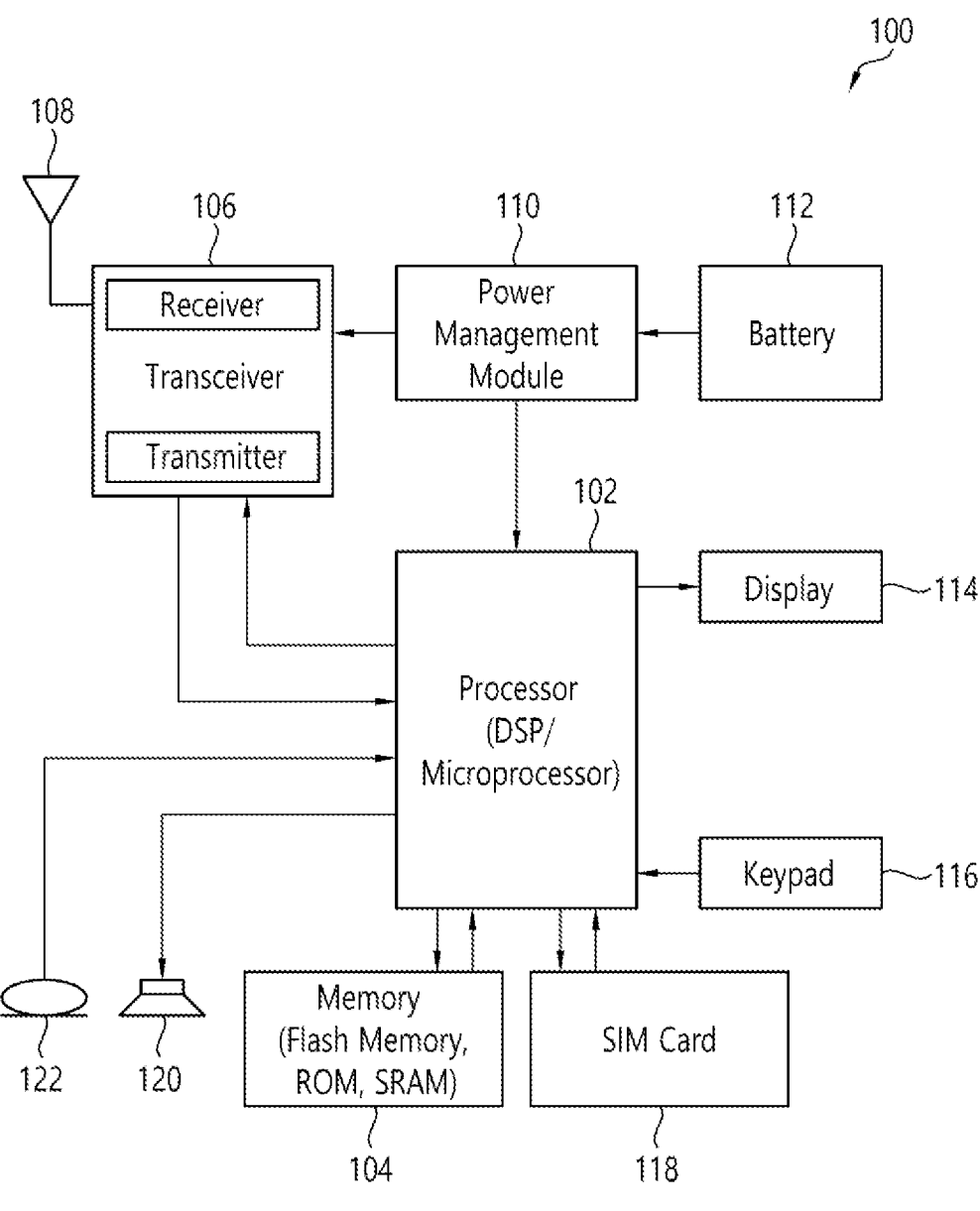
FIG. 4 shows an example of UE to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
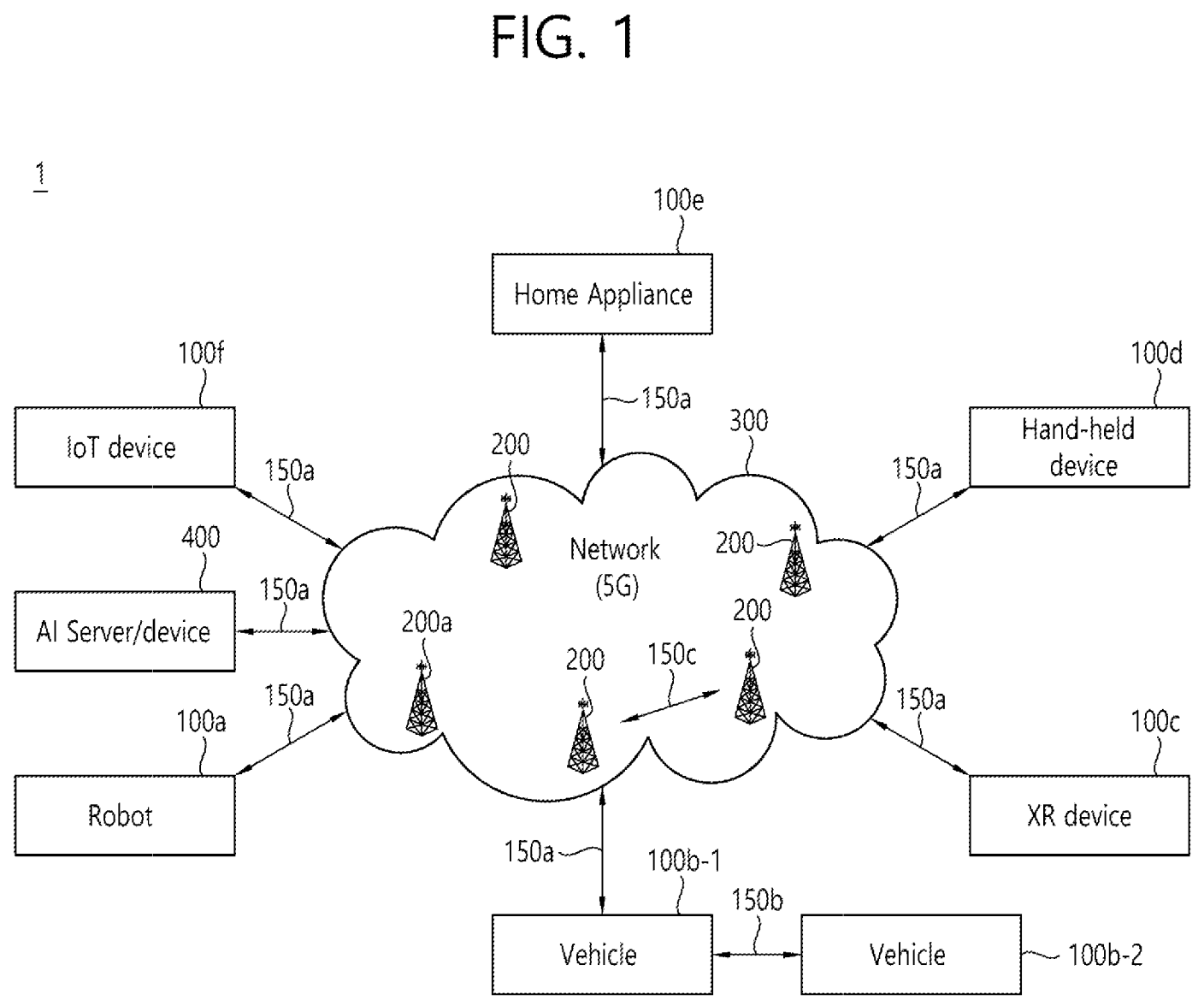

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 KHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
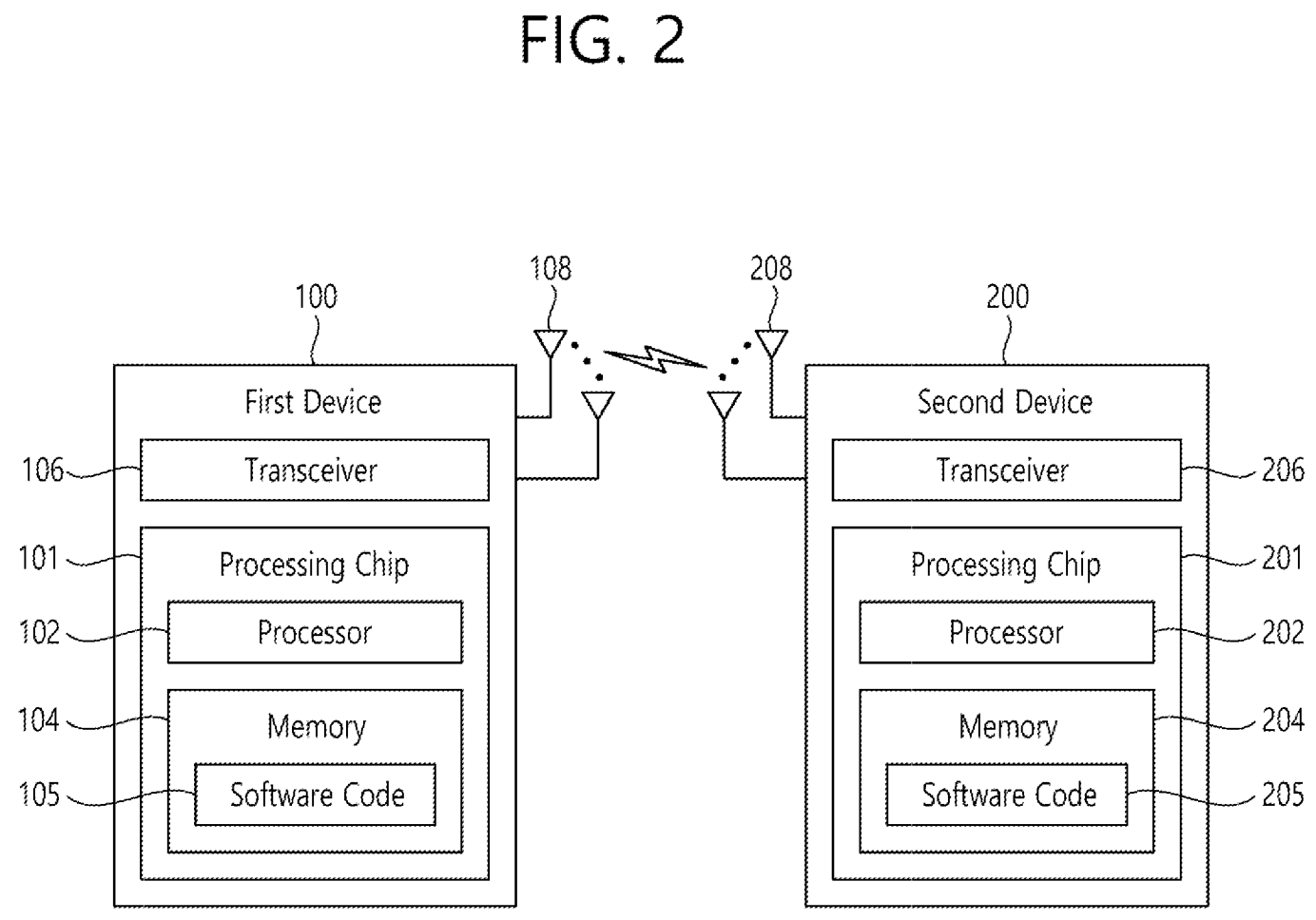

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/ signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
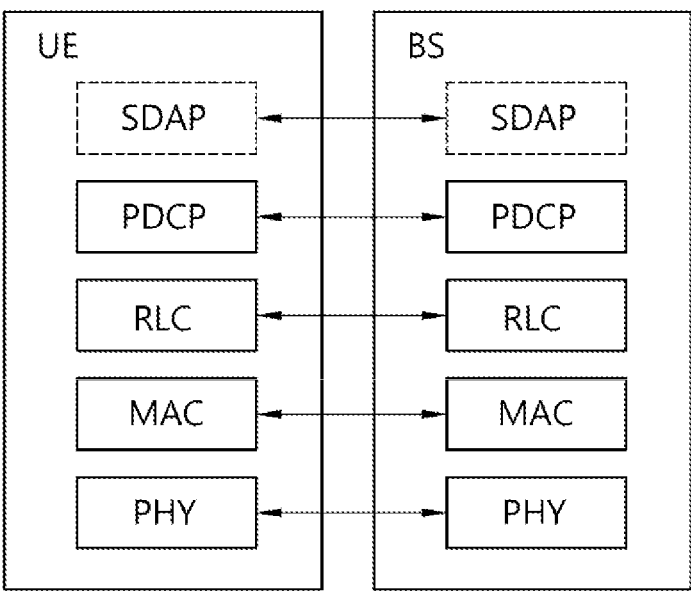
FIGS. 5 and 6 show an example of protocol stacks in a 3GPP based wireless communication system to which implementations of the present disclosure is applied.
Figure 6:
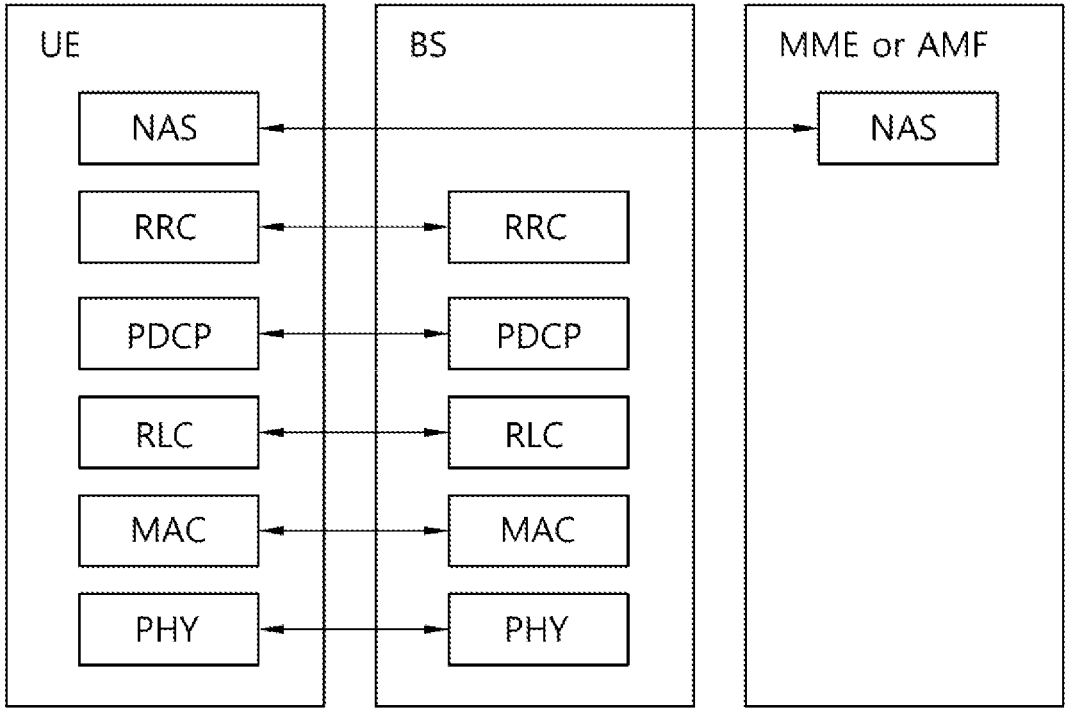

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH): CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 7:
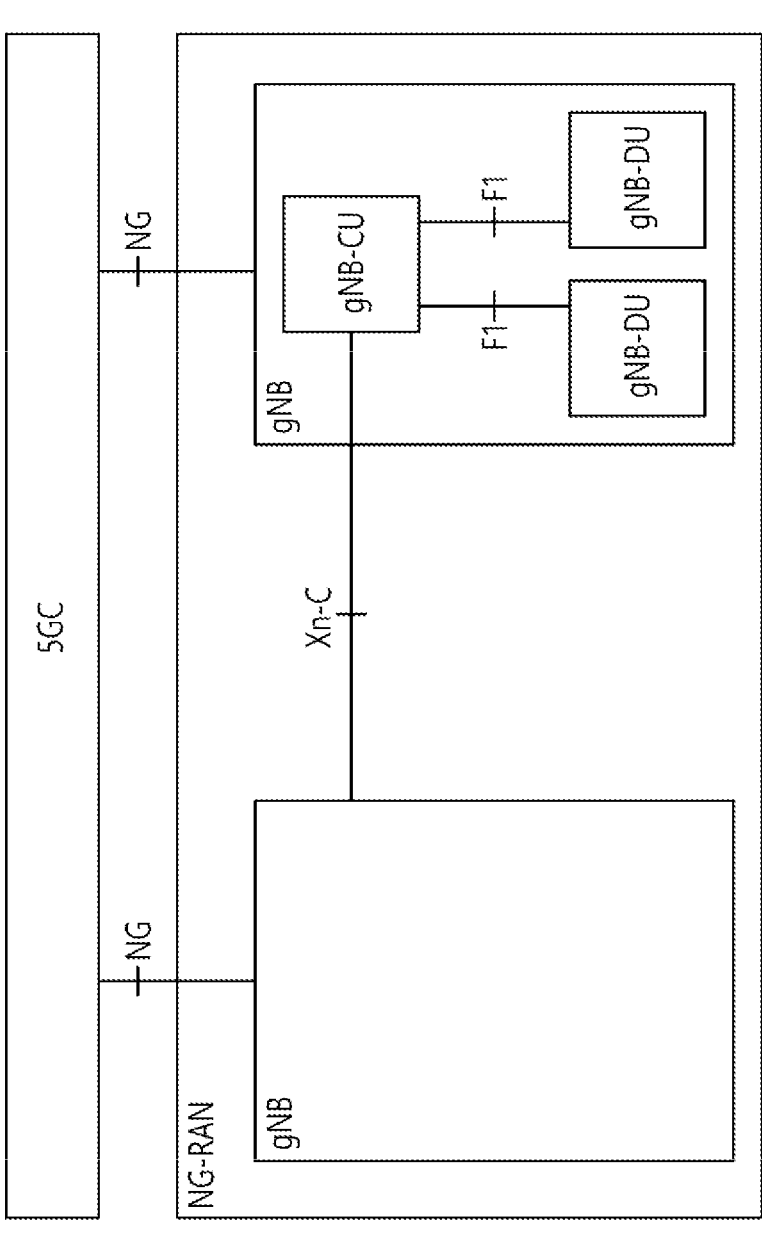
FIG. 7 shows an example of the overall architecture of an NG-RAN to which technical features of the present disclosure can be applied.

FIG. 7 shows an example of the overall architecture of an NG-RAN to which technical features of the present disclosure can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Figure 8:
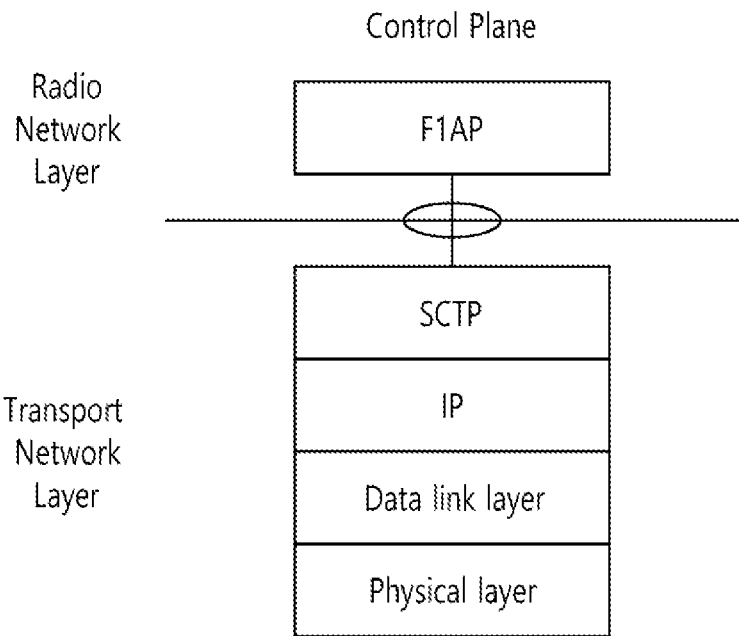
FIG. 8 shows an interface protocol structure for F1-C to which technical features of the present disclosure can be applied.

FIG. 8 shows an interface protocol structure for F1-C to which technical features of the present disclosure can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

Hereinafter, terms for the present disclosure are described. Section 3.1 of 3GPP TS 37.817 v0.1.0 may be referred.

Data collection: Data collected from the network nodes, management entity or UE, as a basis for ML model training, data analytics and inference.

ML Model: A data driven algorithm by applying machine learning techniques that generates a set of outputs consisting of predicted information, based on a set of inputs ML Training: An online or offline process to train an ML model by learning features and patterns that best present data and get the trained ML model for inference.

ML Inference: A process of using a trained ML model to make a prediction or guide the decision based on collected data and ML model.

Figure 9:
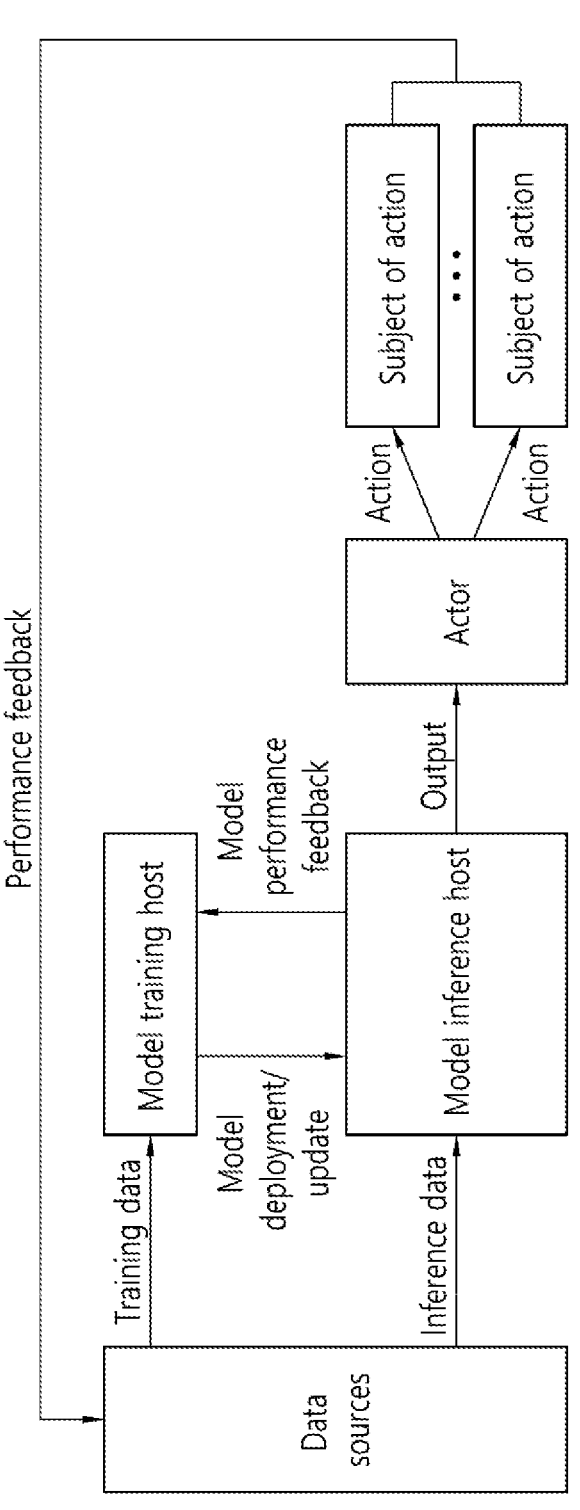
FIG. 9 shows an example of a functional framework for RAN Intelligence to which implementations of the present disclosure is applied.

FIG. 9 shows an example of a functional framework for RAN Intelligence to which implementations of the present disclosure is applied.

Referring to FIG. 9, a model training host may receive, from a data sources, training data. The model training host may provide, to a model inference host, model deployment and/or update. The model training host may receive, from the model inference host, model performance feedback.

The model inference host may receive, form data sources, inference data and transmit, to an actor, output.

The actor may transmit, to one or more subjects of action, an action.

The data sources may receive, from the one or more subjects of action, performance feedback.

For example, the actor and subject of action could be in one box or separate.

For example, the feedback from action to Model training host may be needed.

For example, the feedback from subject of action to the data sources may be Performance feedback or Model performance feedback and other possible refinement.

Hereinafter, mobility in RRC_CONNECTED is described. Section 9.2.3 of 3GPP TS 38. 300 v 15.7.0 may be referred.

Network controlled mobility applies to UEs in RRC_CONNECTED and is categorized into two types of mobility: cell level mobility and beam level mobility.

Cell Level Mobility requires explicit RRC signalling to be triggered, i.e. handover.

Figure 10:
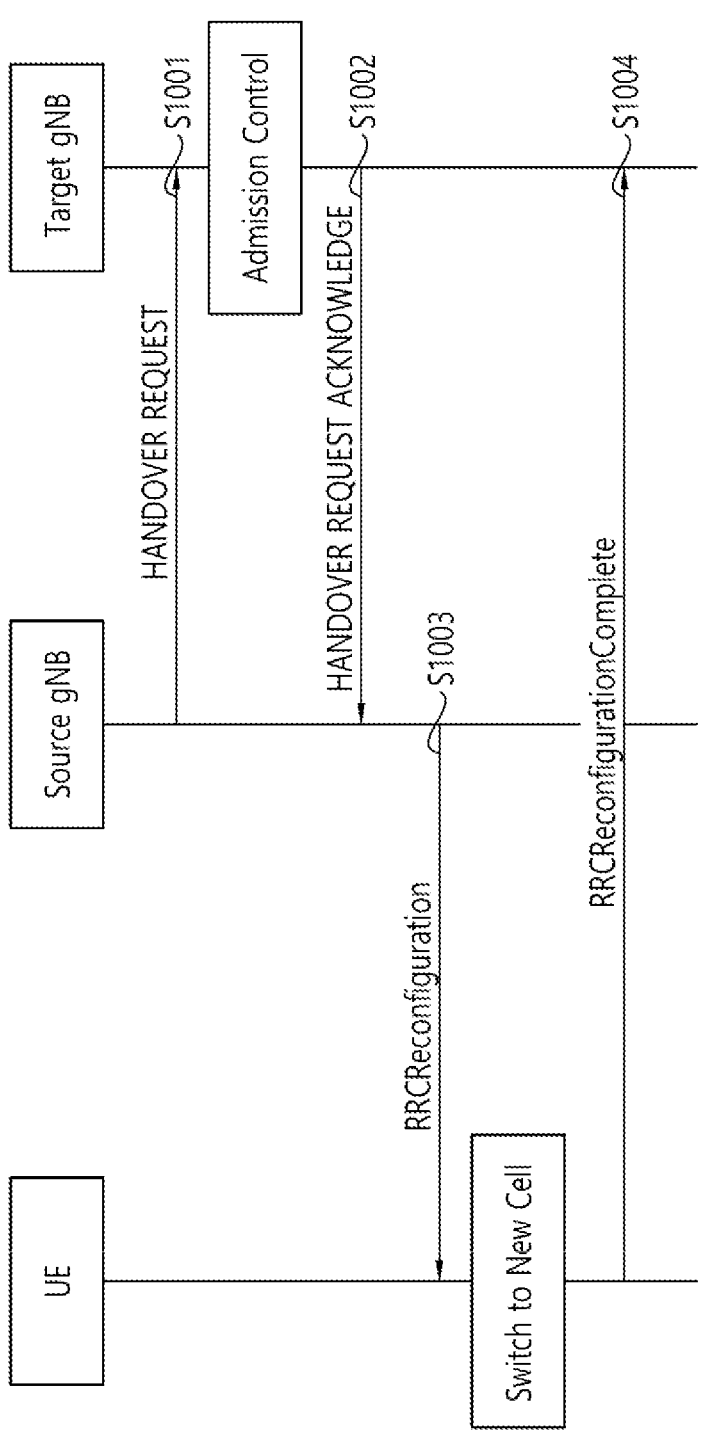
FIG. 10 shows an example of inter-gNB handover procedure to which implementations of the present disclosure is applied.

FIG. 10 shows an example of inter-gNB handover procedure to which implementations of the present disclosure is applied.

In step S1001, the source gNB initiates handover and issues a HANDOVER REQUEST over the Xn interface.

In step S1002, the target gNB performs admission control and provides the new RRC configuration as part of the HANDOVER REQUEST ACKNOWLEDGE.

In step S1003, the source gNB provides the RRC configuration to the UE by forwarding the RRCReconfiguration message received in the HANDOVER REQUEST ACKNOWLEDGE. The RRCReconfiguration message includes at least cell ID and all information required to access the target cell so that the UE can access the target cell without reading system information. For some cases, the information required for contention-based and contention-free random access can be included in the RRCReconfiguration message. The access information to the target cell may include beam specific information, if any.

In step S1004, the UE moves the RRC connection to the target gNB and replies with the RRCReconfigurationComplete.

User Data can also be sent in step 4 if the grant allows.

The handover mechanism triggered by RRC requires the UE at least to reset the MAC entity and re-establish RLC. RRC managed handovers with and without PDCP entity re-establishment are both supported. For DRBs using RLC AM mode, PDCP can either be re-established together with a security key change or initiate a data recovery procedure without a key change. For DRBs using RLC UM mode and for SRBs, PDCP can either be re-established together with a security key change or remain as it is without a key change.

Data forwarding, in-sequence delivery and duplication avoidance at handover can be guaranteed when the target gNB uses the same DRB configuration as the source gNB.

Timer based handover failure procedure is supported in NR. RRC connection re-establishment procedure is used for recovering from handover failure.

Beam Level Mobility does not require explicit RRC signalling to be triggered. The gNB provides via RRC signalling the UE with measurement configuration containing configurations of SSB/CSI resources and resource sets, reports and trigger states for triggering channel and interference measurements and reports. Beam Level Mobility is then dealt with at lower layers by means of physical layer and MAC layer control signalling, and RRC is not required to know which beam is being used at a given point in time.

SSB-based Beam Level Mobility is based on the SSB associated to the initial DL BWP and can only be configured for the initial DL BWPs and for DL BWPs containing the SSB associated to the initial DL BWP. For other DL BWPs, Beam Level Mobility can only be performed based on CSI-RS.

Artificial Intelligence (AI) including machine learning (ML) algorithms provides a powerful tool to help operators to improve the network management and the user experience, by analyzing the data collected and autonomously processed that can yield further insights. Application of AI in 5G network has gained tremendous attention in both academia and industry.

Although most of the AI algorithms can be up to implementation, the signalling support for AI deserves study of the training and the execution involved in AI schemes, the data required by the AI algorithms (potentially reported by the UE or collected from different parts of the network), and outputs generated by the algorithms to be delivered to other network nodes or Network Functions (NFs) in RAN, CN, or Operations, Administration and Maintenance (OAM)/ Change Management (ChM).

Before the introduction of standardization support for AI, it would be desirable to get some common understanding on the concept of AI and the AI frameworks commonly used in the current or future networks.

Potential use cases and examples could be discussed to identify the AI enabling features; this could include various RAN areas without re-opening existing topics like Self Organization Network (SON), unless a beneficial AI approach is proven for e.g. energy saving, traffic steering, mobility optimization, load balancing, physical layer configuration optimization, etc. Therefore, a study should be conducted to investigate the functional framework of using AI/ML (i.e. data acquisition and exposure) and the high level requirements of operating RAN-AI.

Meanwhile, in 5G NR, basic handover procedure was defined for a UE to moving between the neighbors. Conventionally, the source RAN decides a target node based on measurement report of the signaling quality of the neighbor. However, it may cause a problem, such as, handover failure, HO to wrong cell, ping-pang.

Therefore, studies for performing handover based on AI model in a wireless communication system are needed.

Hereinafter, a method for performing handover based on AI model in a wireless communication system, according to some embodiments of the present disclosure, will be described.

FIG. 11 shows an example of a method for performing handover based on AI model in a wireless communication system, according to some embodiments of the present disclosure.

In particular, FIG. 11 shows an example of a method performed by a source Radio Access Network (RAN) node in a wireless communication system.

In step S1101, the source RAN node may acquire a mobility information for a specific UE. The mobility information may include (i) a mobility statics for the specific UE and (ii) a mobility prediction for the specific UE.

For example, the mobility information for the specific UE may be included in a UE context for the specific UE. For example, the UE context may include information regarding roaming and access restrictions which were provided either at connection establishment or at the last TA update.

For example, the mobility information may be provided by the AI function in a core network (CN).

For example, the mobility information for the specific UE may include (i) information on mobility statistics for the specific UE and/or (ii) information on mobility prediction for the specific UE.

The information on mobility statistics may include at least one of (i) UE group ID or UE ID (for example, Subscription Permanent Identifier (SUPI) and/or (ii) a time slot entry.

The time slot entry may include list of time slots during the analytics target period. In particular, the time slot entry may include (i) time slot start (time slot start within the Analytics target period), (ii) Duration (Duration of the time slot (average and variance)), and/or (iii) information on UE location (Observed location statistics). For example, information on UE location may include (i) UE location (TA and/or cells which the UE stays) and/or (ii) Ratio (Percentage of UEs in the group (in the case of an UE group)).

The information on mobility prediction may include at least one of (i) UE group ID or UE ID (for example, Subscription Permanent Identifier (SUPI) and/or (ii) a time slot entry.

The time slot entry may include list of predicted time slots. In particular, the time slot entry may include (i) time slot start (time slot start within the Analytics target period), (ii) Duration (Duration of the time slot (average and variance)), and/or (iii) information on UE location (predicted location prediction during the analytics target period). For example, information on UE location may include (i) UE location (TA or cells where the UE or UE group may move into), (ii) confidence of this prediction, and/or (iii) Ratio (Percentage of UEs in the group (in the case of an UE group)).

In step S1102, the source RAN node may transmit, to the specific UE, a measurement configuration including a request for a location information.

For example, the measurement configuration may include an indication of requesting to report the location information of the specific UE.

In step S1103, the source RAN node may receive, from the specific UE, the location information. The location information may include on (i) a current location for the specific UE, and/or (ii) a past location for the specific UE.

For example, the location information may include a predicted location for the specific UE. The predicted location for the specific UE may include (i) information on Global Positioning System (GPS), Global Navigation Satellite System (GNSS), Tracking Area (TA) and/or a cell where the specific UE will move into and/or (ii) information on confidence of the predicted location. The predicted location for the specific UE may include output of at least one AI model of the specific UE.

For other example, the location information may not include a predicted location for the specific UE, based on that the specific UE does not include an AI model.

In step S1104, the source RAN node may determine a target RAN node for the specific UE by using an AI model, based on the mobility information and the location information.

For example, input of the AI model may include (i) the acquired mobility information (ii) the received location information and (iii) the UE history information. Output of the AI model may include the target RAN node or the target cell ID for the specific UE.

For other example, output of the AI model includes (i) one or more candidate target RAN nodes or cells and (ii) probability or confidence of the one or more candidate target RAN nodes or cells. In this case, the source RAN node may determine a target RAN node for the specific UE among the candidate target RAN nodes by considering the probability of the one or more candidate target RAN nodes.

For example, the AI model may be trained by the mobility information, the location information, and UE history information.

In step S1105, the source RAN node may determine a target RAN node for the specific UE by using an AI model, based on the mobility information and the location information.

For example, the source RAN node may transmit, to the target RAN node, a Handover Request message including the mobility information and the location information. In addition, the Handover Request message may include the output of the AI model of the source RAN node.

The target RAN node may store the mobility information and the location information. The target RAN node may use the stored information for next mobility of the specific UE or other UE.

The target RAN node may perform admission Control and transmit a HANDOVER REQUEST ACKNOWLEDGE to the source gNB.

The source RAN node may transmit, to the specific UE, a Radio Resource Control (RRC) Reconfiguration message including the mobility information and information on output for the AI model.

The UE may store the mobility information and information on output for the AI model. If the UE has an AI model, the UE may use the received information for the AI model to predict a future location of the UE. The UE could transmit the stored information to a new RAN node.

The source RAN node may send an SN STATUS TRANSFER message to the target gNB.

The UE may synchronise to the target RAN node and complete the RRC handover procedure by sending RRCReconfigurationComplete message to target RAN node.

The target RAN node may send a PATH SWITCH REQUEST message to a core network node to switch the DL data path towards the target RAN node and to establish an NG-C interface instance towards the target RAN node.

In this case, the PATH SWITCH REQUEST message may include (i) the mobility information, (ii) the location information, and/or (iii) the output of the AI model received from the source RAN node.

The core network node may updated information for the specific UE based on the received information from the target RAN node. For example, the core network node may provide a new UE context for the specific UE, based on the updated information.

The core network node may switch the DL data path towards the target RAN node. The core network node may confirm the PATH SWITCH REQUEST message with a PATH SWITCH REQUEST ACKNOWLEDGE message.

For example, the PATH SWITCH REQUEST ACKNOWLEDGE message may include updated information for the specific UE.

For example, the updated information may include (1) updated mobility statistics for the specific UE and (2) updated mobility predictions for the specific UE.

Upon receiving the PATH SWITCH REQUEST ACKNOWLEDGE message from the core network node, the target RAN node may send the UE CONTEXT RELEASE to inform the source RAN node about the success of the handover. The source RAN node may release radio and C-plane related resources associated to the UE context.

According to some embodiments of the present disclosure, the specific UE may be in communication with at least one of a user equipment, a network, or an autonomous vehicle other than the specific UE.

Figure 12A:
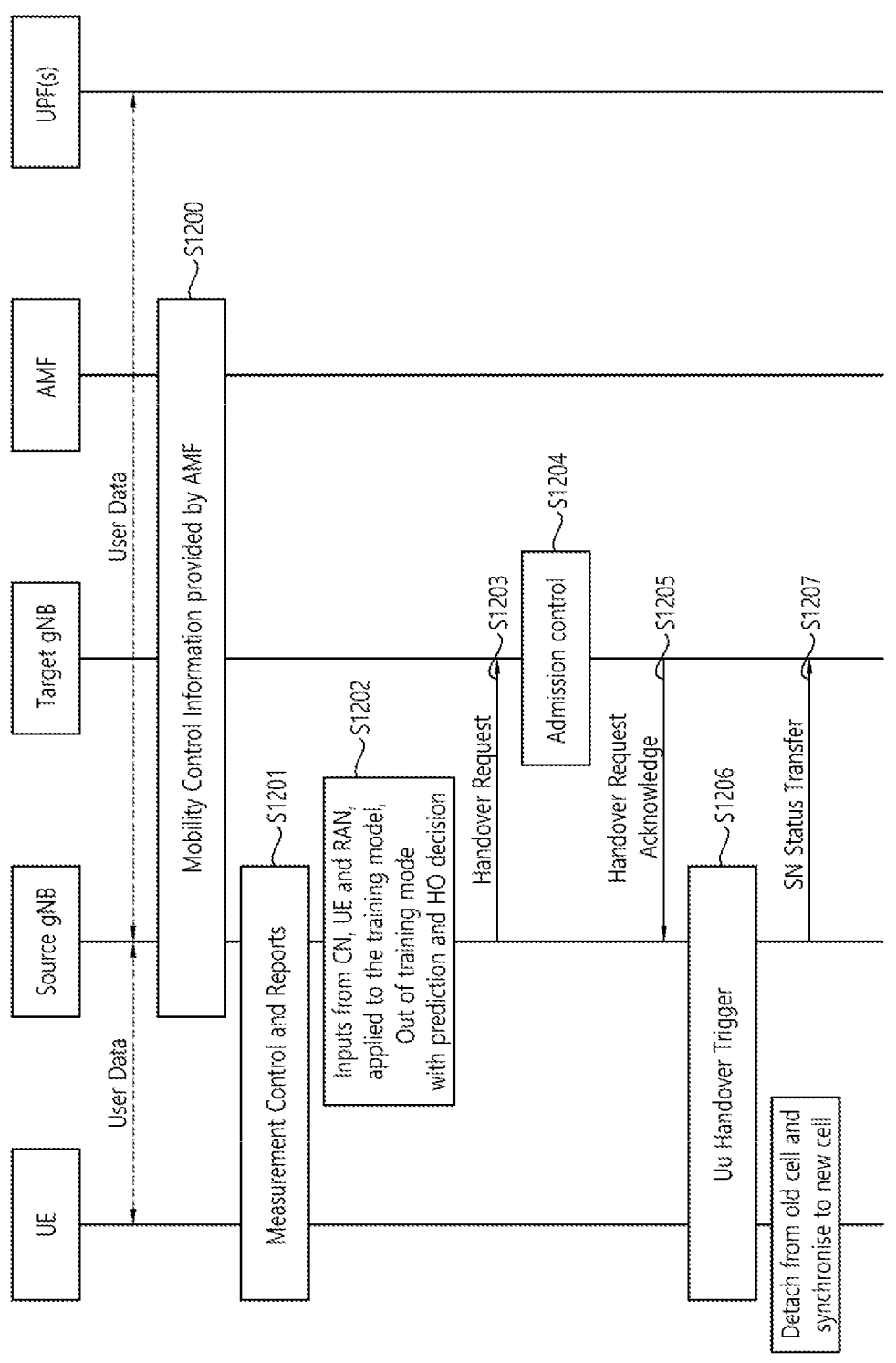
Figure 12B:
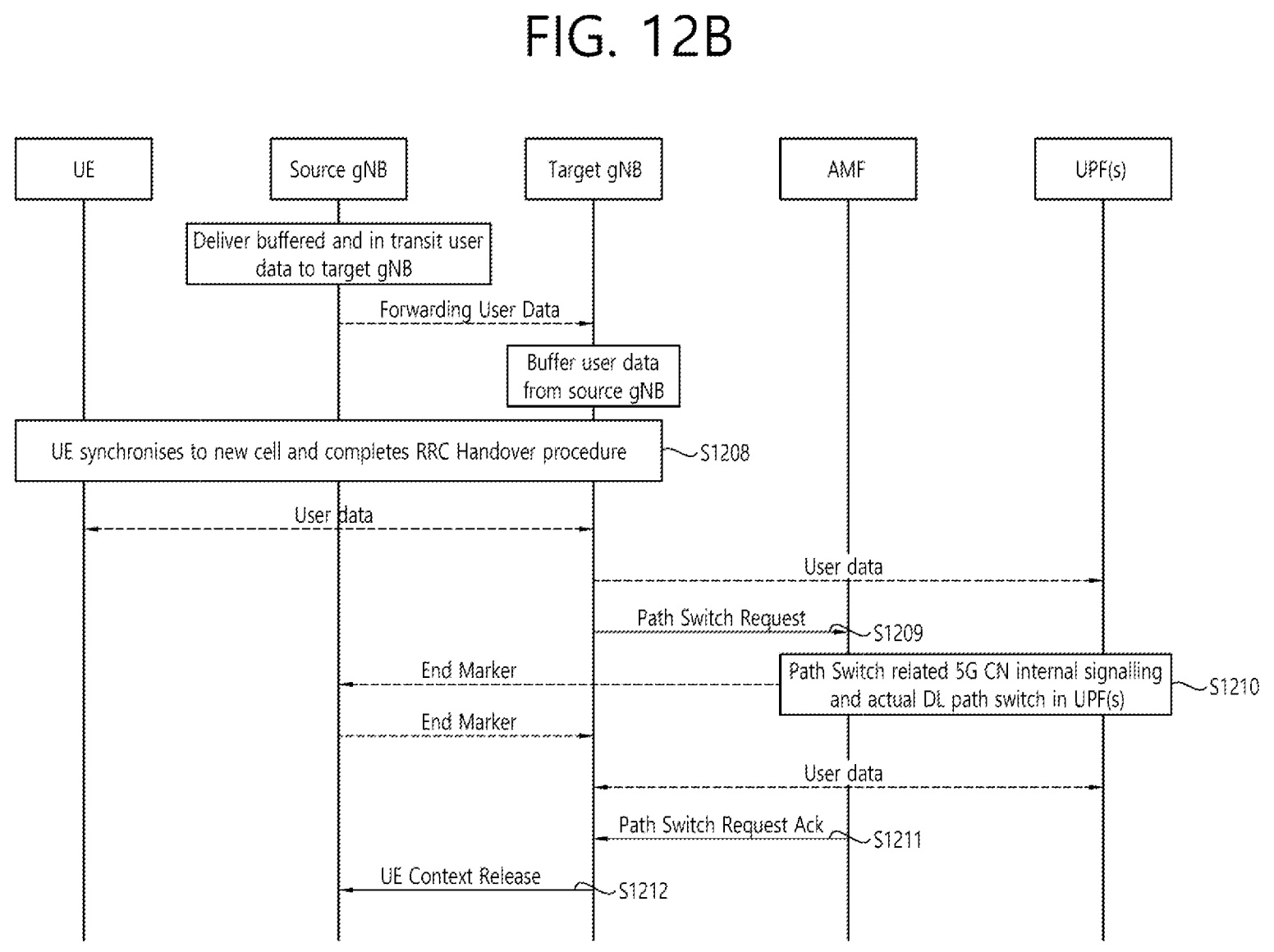

FIGS. 12A and 12B show an example of a method for performing handover based on AI model in a wireless communication system.

In particular, FIGS. 12A and 12B illustrate a diagram for AI based mobility procedure for a specific UE.

In step S1200, the UE context within the source gNB may contain information regarding roaming and access restrictions which were provided either at connection establishment or at the last TA update.

The following information may be also included for AI based handover, which is from the analytics results provided by the AI function in CN:

(1) UE Mobility Statistics:
 —UE group ID or UE ID, for example, SUPI
 —Time slot entry (1 . . . max): List of time slots during the Analytics target period
 >Time slot start: Time slot start within the Analytics target period
 >Duration: Duration of the time slot (average and variance)
 >UE location (1 . . . max): Observed location statistics
  >>UE location: TA or cells which the UE stays
  >>Ratio: Percentage of UEs in the group (in the case of an UE group)

(2) UE Mobility Predictions:
 —UE group ID or UE ID, for example, Subscription Permanent Identifier (SUPI)
 —Time slot entry (1 . . . max): List of predicted time slots
 <Time slot start: Time slot start within the Analytics target period
 <Duration: Duration of the time slot (average and variance)
 <UE location (1 . . . max): Predicted location prediction during the Analytics target period
  >>UE location: TA or cells where the UE or UE group may move into
  >>Confidence of this prediction
  >>Ratio: Percentage of UEs in the group (in the case of an UE group)

For example, the number of time slots and UE locations may be limited by the maximum number of objects provided as part of Analytics Reporting Information.

For example, the time slots may be provided by order of time, possibly overlapping. The locations may be provided by decreasing value of ratio for a given time slot. The sum of all ratios on a given time slot may be equal or less than 100%. Depending on the list size limitation, the least probable locations on a given Analytics target period may not be provided.

In step S1201, the source gNB may configure the UE measurement procedures (including the indication of requesting to report UE's location information (current and past), and/or the indication of reporting UE's AI model training result on the location) and the UE may report according to the measurement configuration and request.

—UE may report the current location information and the past location information (for example, GPS, GNSS). The location information (for example, the current location and the past location) may include (i) TA or cells which the UE stays and (ii) the duration in which UE stays. Universal time can be referred.

—UE may also have an AI based training model on its locations in the past time duration. For example, the input for the AI model may include GPS and/or GNSS. The input may include TA or cells which the UE stays and the duration in which UE stays (universal time can be referred). The output for the AI model may include (i) predicted location prediction during the analytics target period, for example, the output for the AI model may include GPS, GNSS, TA or cells where the UE or UE group may move into, and (ii) the confidence of this prediction.

(i) The information received from CN in step S1200, (ii) UE's location information received from UE in step S1201, and (iii) the UE history information and UE's past mobility pattern, will be the input to AI model for training in RAN side (eNB or gNB). The proper algorithm may be applied.

According to some embodiments of the present disclosure, the predication result of UE received in step S1201 can be the direct reference for RAN to decide the target as an option.

The output of this training model in RAN, i.e., predicated target cell IDs/gNB IDs (also Confidence of this prediction) together with the information of RSRP/RSRP received before will be the factors for the source gNB to decide the target node.

For example, the AI training model here may locate in this source gNB/eNB or other central node, which may manage many RAN nodes. The information above received in step S1200 and S1201 may pass to the central node and the result may be passed back to source RAN/gNB. It is also possible to locate the AI training model in a specific CU.

The source gNB may decide to handover the UE to a specific target node that it selected based on the information above.

In step S1203, the source gNB may issue a Handover Request message to the target gNB passing a transparent RRC container with necessary information to prepare the handover at the target side. The information may include at least one of (1) the target cell ID, (2) a key for gNB (KgNB*), (3) the Cell-Radio Network Temporary Identifier (C-RNTI) of the UE in the source gNB, (4) Radio Resource Management (RRM)-configuration including UE inactive time, (5) basic Access Stratum (AS)-configuration including antenna Info and DL Carrier Frequency, (6) the current QoS flow to DRB mapping rules applied to the UE, (7) the SIBI from source gNB, (viii) the UE capabilities for different RATs, and/or (9) PDU session related information. In addition, the information may include the UE reported measurement information including beam-related information, if available. The PDU session related information may include the slice information, QoS flow level, and/or QoS profile(s).

In this message (i.e. the Handover Request message), the information received from CN in step S1200 may be also included for further mobility to consider.

(1) UE Mobility Statistics:

—UE group ID or UE ID, for example, Subscription Permanent Identifier (SUPI)

—Time slot entry (1 . . . max): List of time slots during the Analytics target period >Time slot start: Time slot start within the Analytics target period >Duration: Duration of the time slot (average and variance)

>UE location (1 . . . max): Observed location statistics

>>UE location: TA or cells which the UE stays

>>Ratio: Percentage of UEs in the group (in the case of an UE group)

(2) UE Mobility Predictions:

—UE group ID or UE ID, e.g. SUPI

>Time slot entry (1 . . . max): List of predicted time slots

>Time slot start: Time slot start within the Analytics target period

>Duration: Duration of the time slot (average and variance)

>UE location (1 . . . max): Predicted location prediction during the Analytics target period >>UE location: TA or cells where the UE or UE group may move into >>Confidence of this prediction >>Ratio: Percentage of UEs in the group (in the case of an UE group)

In this message, the information from UE in step S1201 is also included:

—UE's reported current location information and the past location information, for example, GPS, GNSS. (The current/past location information may also include TA or cells which the UE stays and the duration in which UE stays (universal time can be referred)).

—UE's reported predicted location prediction during the Analytics target period, for example, GPS, GNSS, TA or cells where the UE or UE group may move into, and/or the confidence of this prediction.

In this message (i.e. the Handover Request message), the output information of the AI training model in step S1202, i.e., the predicated further target cell IDs/gNB IDs (also Confidence of this prediction) may be also included for further mobility to consider.

In step S1204, admission control may be performed by the target gNB.

Slice-aware admission control may be performed if the slice information is sent to the target gNB. If the PDU sessions are associated with non-supported slices, the target gNB may reject such PDU Sessions.

The information received in step S1203 may be stored to use for further mobility or for next input of AI training model.

In step S1205, the target gNB may prepare the handover with L1/L2 (for example, Physical (PHY) layer and Media Access Control (MAC) layer) and send the HANDOVER REQUEST ACKNOWLEDGE to the source gNB. the HANDOVER REQUEST ACKNOWLEDGE message may include a transparent container to be sent to the UE as an RRC message to perform the handover.

In step S1206, the source gNB may trigger the Uu handover by sending an RRCReconfiguration message to the UE. The RRCReconfiguration may contain the information required to access the target cell, for example, at least one of (1) the target cell ID, (2) the new C-RNTI, and/or (3) the target gNB security algorithm identifiers for the selected security algorithms.

The information may also include at least one of (1) a set of dedicated RACH resources, (2) the association between RACH resources and SSB(s), (3) the association between RACH resources and UE-specific CSI-RS configuration(s), (4) common RACH resources, and/or (5) system information of the target cell, etc.

The information of the finally selected cell may be also included for UE as a update input/reference of its AI training model, for further mobility behaviour of this UE (for example, UE global ID can be included, for example, SUPI) or other UE.

In step S1207, the source gNB may send the SN STATUS TRANSFER message to the target gNB.

In step S1208, the UE may synchronise to the target cell and complete the RRC handover procedure by sending an RRCReconfigurationComplete message to the target gNB.

In step S1209, the target gNB may send a PATH SWITCH REQUEST message to AMF to trigger 5GC to switch the DL data path towards the target gNB and to establish an NG-C interface instance towards the target gNB.

The AI related information/indication could be included for this UE, for example, UE global ID SUPI, for request of updating the AI related information from CN. CN could obtain the updated information for this UE based on the AI model in CN.

In step S1210, 5GC may switch the DL data path towards the target gNB. The UPF may send one or more "end marker" packets on the old path to the source gNB per PDU session/tunnel and then could release any U-plane/TNL resources towards the source gNB.

In step S1211, the AMF may confirm the PATH SWITCH REQUEST message with the PATH SWITCH REQUEST ACKNOWLEDGE message. If update is necessary, the following information can be included for RAN to update:

(1) UE Mobility Statistics:

—UE group ID or UE ID, e.g. SUPI

—Time slot entry (1 . . . max): List of time slots during the Analytics target period >Time slot start: Time slot start within the Analytics target period >Duration: Duration of the time slot (average and variance)

>UE location (1 . . . max): Observed location statistics

>>UE location: TA or cells which the UE stays

>>Ratio: Percentage of UEs in the group (in the case of an UE group)

(2) UE Mobility Predictions:

—UE group ID or UE ID, e.g. SUPI

—Time slot entry (1 . . . max): List of predicted time slots

>Time slot start: Time slot start within the Analytics target period

>Duration: Duration of the time slot (average and variance)

>UE location (1 . . . max): Predicted location prediction during the Analytics target period >>UE location: TA or cells where the UE or UE group may move into >>Confidence of this prediction >>Ratio: Percentage of UEs in the group (in the case of an UE group)

In step S1212, upon reception of the PATH SWITCH REQUEST ACKNOWLEDGE message from the AMF, the target gNB may send the UE CONTEXT RELEASE to inform the source gNB about the success of the handover. Then, the source gNB can release radio and C-plane related resources associated to the UE context. Any ongoing data forwarding may continue.

Herein, all the messages above are examples by using the existing procedures, but they are not limited. That is, new messages can be defined to realize the same goal.

Some of the detailed steps shown in the example of FIGS. 11, 12A, and 12B may not be essential steps and may be omitted. In addition, steps other than the steps shown in FIGS. 11, 12A, and 12B may be added, and the order of the steps may vary. Some of the above steps may have their own technical meaning.

Hereinafter, an apparatus for performing handover based on AI model in a wireless communication system, according to some embodiments of the present disclosure, will be described.

For example, a source Radio Access Network (RAN) node may include a processor, and a memory. The processor may be configured to be coupled operably with the memory.

The processor may be configured to acquire a mobility information for a specific UE. The mobility information may include (i) a mobility statics for the specific UE and (ii) a mobility prediction for the specific UE. The processor may be configured to transmit, to the specific UE, a measurement configuration including a request for a location information. The processor may be configured to receive, from the specific UE, the location information. The location information may include on (i) a current location for the specific UE, and/or (ii) a past location for the specific UE. The processor may be configured to determine a target RAN node for the specific UE by using an AI model, based on the mobility information and the location information. The processor may be configured to perform a handover procedure for the specific UE with the determined target RAN node.

For example, the location information may include a predicted location for the specific UE. The predicted location for the specific UE may include (i) information on Global Positioning System (GPS), Global Navigation Satellite System (GNSS), Tracking Area (TA) and/or a cell where the specific UE will move into and/or (ii) information on confidence of the predicted location. The predicted location for the specific UE may include output of at least one AI model of the specific UE.

For example, the location information may not include a predicted location for the specific UE, based on that the specific UE does not include an AI model.

For example, the mobility information for the specific UE may be included in a UE context for the specific UE.

For example, the mobility information for the specific UE may include (i) information on mobility statistics for the specific UE and/or (ii) information on mobility prediction for the specific UE.

For example, input of the AI model may include (i) the acquired mobility information (ii) the received location information and (iii) the UE history information.

For example, Output of the AI model may include the target RAN node or the target cell ID for the specific UE.

For example, output of the AI model may include (i) one or more candidate target RAN nodes or cells and (ii) probability or confidence of the one or more candidate target RAN nodes or cells. In this case, the processor may be configured to determine the target RAN node or cell among the candidate target RAN nodes by considering the probability or confidence of the one or more candidate target RAN nodes.

For example, the AI model may be trained by the mobility information, the location information, and UE history information.

For example, the processor may be configured to transmit, to the target RAN node, a Handover Request message including the mobility information and the location information.

For example, the processor may be configured to transmit, to the specific UE, a Radio Resource Control (RRC) Reconfiguration message including the mobility information and information on output for the AI model.

According to some embodiments of the present disclosure, the specific UE may be in communication with at least one of a user equipment, a network, or an autonomous vehicle other than the specific UE.

Hereinafter, a processor for a source RAN node for performing handover based on AI model in a wireless communication system, according to some embodiments of the present disclosure, will be described.

The processor may be configured to control the source RAN node to acquire a mobility information for a specific UE. The mobility information may include (i) a mobility statics for the specific UE and (ii) a mobility prediction for the specific UE. The processor may be configured to control the source RAN node to transmit, to the specific UE, a measurement configuration including a request for a location information. The processor may be configured to control the source RAN node to receive, from the specific UE, the location information. The location information may include on (i) a current location for the specific UE, and/or (ii) a past location for the specific UE. The processor may be configured to control the source RAN node to determine a target RAN node for the specific UE by using an AI model, based on the mobility information and the location information. The processor may be configured to control the source RAN node to perform a handover procedure for the specific UE with the determined target RAN node.

For example, the location information may include a predicted location for the specific UE. The predicted location for the specific UE may include (i) information on Global Positioning System (GPS), Global Navigation Satellite System (GNSS), Tracking Area (TA) and/or a cell where the specific UE will move into and/or (ii) information on confidence of the predicted location. The predicted location for the specific UE may include output of at least one AI model of the specific UE.

For example, the location information may not include a predicted location for the specific UE, based on that the specific UE does not include an AI model.

For example, the mobility information for the specific UE may be included in a UE context for the specific UE.

For example, the mobility information for the specific UE may include (i) information on mobility statistics for the specific UE and/or (ii) information on mobility prediction for the specific UE.

For example, input of the AI model may include (i) the acquired mobility information (ii) the received location information and (iii) the UE history information.

For example, Output of the AI model may include the target RAN node or the target cell ID for the specific UE.

For example, output of the AI model may include (i) one or more candidate target RAN nodes or cells and (ii) probability or confidence of the one or more candidate target RAN nodes or cells. In this case, the processor may be configured to control the source RAN node to determine the target RAN node or cell among the candidate target RAN nodes by considering the probability or confidence of the one or more candidate target RAN nodes.

For example, the AI model may be trained by the mobility information, the location information, and UE history information.

For example, the processor may be configured to control the source RAN node to transmit, to the target RAN node, a Handover Request message including the mobility information and the location information.

For example, the processor may be configured to control the source RAN node to transmit, to the specific UE, a Radio Resource Control (RRC) Reconfiguration message including the mobility information and information on output for the AI model.

According to some embodiments of the present disclosure, the specific UE may be in communication with at least one of a user equipment, a network, or an autonomous vehicle other than the specific UE.

Hereinafter, a non-transitory computer-readable medium has stored thereon a plurality of instructions for performing handover based on AI model in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a source RAN node.

The stored a plurality of instructions may cause the source RAN node to acquire a mobility information for a specific UE. The mobility information may include (i) a mobility statics for the specific UE and (ii) a mobility prediction for the specific UE. The stored a plurality of instructions may cause the source RAN node to transmit, to the specific UE, a measurement configuration including a request for a location information. The stored a plurality of instructions may cause the source RAN node to receive, from the specific UE, the location information. The location information may include on (i) a current location for the specific UE, and/or (ii) a past location for the specific UE. The stored a plurality of instructions may cause the source RAN node to determine a target RAN node for the specific UE by using an AI model, based on the mobility information and the location information. The stored a plurality of instructions may cause the source RAN node to perform a handover procedure for the specific UE with the determined target RAN node.

For example, the location information may include a predicted location for the specific UE. The predicted location for the specific UE may include (i) information on Global Positioning System (GPS), Global Navigation Satellite System (GNSS), Tracking Area (TA) and/or a cell where the specific UE will move into and/or (ii) information on confidence of the predicted location. The predicted location for the specific UE may include output of at least one AI model of the specific UE.

For example, the location information may not include a predicted location for the specific UE, based on that the specific UE does not include an AI model.

For example, the mobility information for the specific UE may be included in a UE context for the specific UE.

For example, the mobility information for the specific UE may include (i) information on mobility statistics for the specific UE and/or (ii) information on mobility prediction for the specific UE.

For example, input of the AI model may include (i) the acquired mobility information (ii) the received location information and (iii) the UE history information.

For example, Output of the AI model may include the target RAN node or the target cell ID for the specific UE.

For example, output of the AI model may include (i) one or more candidate target RAN nodes or cells and (ii) probability or confidence of the one or more candidate target RAN nodes or cells. In this case, the stored a plurality of instructions may cause the source RAN node to determine the target RAN node or cell among the candidate target RAN nodes by considering the probability or confidence of the one or more candidate target RAN nodes.

For example, the AI model may be trained by the mobility information, the location information, and UE history information.

For example, the stored a plurality of instructions may cause the source RAN node to transmit, to the target RAN node, a Handover Request message including the mobility information and the location information.

For example, the stored a plurality of instructions may cause the source RAN node to transmit, to the specific UE, a Radio Resource Control (RRC) Reconfiguration message including the mobility information and information on output for the AI model.

According to some embodiments of the present disclosure, the specific UE may be in communication with at least one of a user equipment, a network, or an autonomous vehicle other than the specific UE.

The present disclosure may have various advantageous effects.

According to some embodiments of the present disclosure, UE's mobility performance could be enhanced by using AI model for handover procedure.

For example, a source node could accurately decide a target node for handover procedure for UE.

Therefore, the handover failure (for example, handover to wrong cell, and/or handover ping-pang) could be avoided as much as possible. Then, UE's service could be guaranteed without interruption.

According to some embodiments of the present disclosure, a Radio Access Network (RAN) node could efficiently perform handover based on AI model.

For example, a RAN node could efficiently acquire information for AI based handover.

For example, a RAN node could efficiently support handover based on AI model by collecting information from a core network and the UE.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising,
transmitting, by a source node to a User Equipment (UE), a measurement configuration;
receiving, by the source node from the UE, a measurement report including location information based on the measurement configuration;
transmitting, by the source node to a target node, a handover request message related to the UE,
wherein the handover request message includes prediction information for cells where the UE is predicted to connect,
wherein the prediction information includes one or more predicted information, and
wherein each predicted information includes (i) information a for a predicted cell and (ii) duration information; and
receiving, by the source node from the target node, a handover request acknowledge message in response to the handover request message.

2. The method of claim 1, wherein the UE is in communication with at least one of a user equipment, a network, or an autonomous vehicle other than the UE.

3. The method of claim 1,
wherein the location information further includes at least one of (i) a current location for the UE or (ii) a past location for the UE.

4. The method of claim 3,
wherein the location information further includes a predicted location for the UE, and
wherein the predicted location includes at least one of:
    (i) information for at least one of:
        a Global Positioning System (GPS),
        a Global Navigation Satellite System (GNSS),
        a Tracking Area (TA), or
        a cell where the UE will move into; or
    (ii) information for confidence of the predicted location.

5. The method of claim 4, wherein the predicted location for the UE includes output of at least one of:
    an Artificial Intelligence (AI) model,
    a Machine Learning (ML) model, or
    an inference function.

6. The method of claim 1, wherein the prediction information includes one or more predicted information, in time order.

7. The method of claim 1, wherein the duration information is related to a predicted duration of time the UE stays in the predicted cell.

8. The method of claim 1, wherein the prediction information includes output of at least one of:
    an Artificial Intelligence (AI) model,
    a Machine Learning (ML) model, or
    an inference function.

9. The method of claim 1, wherein the prediction information is transmitted from the UE or a core network node.

10. The method of claim 1,
wherein the source node is a source gNB, and
wherein the target node is a target gNB.

11. A source node comprising:
a memory; and
at least one processor operatively coupled to the memory, and adapted to perform operations, the operations comprising:
    transmitting, to a User Equipment (UE), a measurement configuration;
    receiving, from the UE, a measurement report including location information based on the measurement configuration;
    transmitting, to a target node, a handover request message related to the UE,
    wherein the handover request message includes prediction information for cells where the UE is predicted to connect,
    wherein the prediction information includes one or more predicted information, and
    wherein each predicted information includes (i) information for a predicted cell and (ii) duration information; and
    receiving, from the target node, a handover request acknowledge message.

12. The source node of claim 11,
wherein the source node is a source gNB, and
wherein the target node is a target gNB.

13. A method comprising,
receiving, by a User Equipment (UE) from a source node, a measurement configuration; and
transmitting, by the UE to the source node, measurement reports including location information based on the measurement configuration,
wherein the source node transmits, to a target node, a handover request message related to the UE, wherein the handover request message includes prediction information for cells where the UE is predicted to connect, wherein the prediction information includes one or more predicted information, and wherein each predicted information includes (i) information for a predicted cell and (ii) duration information; and wherein the source node receives, from the target node, a handover request acknowledge message in response to the handover request message.

14. The method of claim 13, wherein the prediction information includes one or more predicted information, in time order.

15. The method of claim 13, wherein the duration information is related to a predicted duration of time the UE stays in the predicted cell.

16. The method of claim 13, wherein the prediction information includes output of at least one of:

an Artificial Intelligence (AI) model, a Machine Learning (ML) model, or an inference function.

17. The method of claim 13, wherein the prediction information is transmitted from the UE or a core network node.

18. The method of claim 13, wherein the source node is a source gNB, and wherein the target node is a target gNB.

19. The method of claim 13, wherein the UE is in communication with at least one of a user equipment, a network, or an autonomous vehicle other than the UE.

\* \* \* \* \*